Patented Feb. 7, 1950

2,496,671

UNITED STATES PATENT OFFICE 2,496,671

TITANIUM CARBIDE ARTICLE

Harold R. Montgomery, Niagara Falls, Ontario, Canada, assignor to Norton Company, Worcester, Mass., a corporation of Massachusetts No Drawing. Application September 14, 1948,
Serial No. 49,306

1 Claim. (Cl. 106—43)

The invention relates to the manufacture of dense refractory articles.

One object of the invention is to make a good crucible for use at high temperatures. Another object is to provide a crucible which is highly refractory and has sufficient electrical conductivity to be heated inductively. Another object is to provide superior mortars and pestles for special purposes where contamination is especially to be avoided. Another object is to make nozzle liners for no recoil guns and for rocket nozzles. Another object is to make articles for many purposes which are highly refractory, very strong and have a hardness equal to about that of silicon carbide.

Other objects will be in part obvious or in part pointed out hereinafter.

The invention accordingly consists in the features of construction, combinations of elements, and in the several steps and relation and order of each of said steps to one or more of the others thereof, all as will be illustratively described herein, and the scope of the application of which will be indicated in the following claim.

For the manufacture of articles according to the invention I use hard dense pure titanium carbide made in accordance with U. S. Letters Patent to Raymond R. Ridgway No. 2,237,503 dated April 8, 1941. I run the Ridgway process to produce carbon-rich titanium carbide that is to say having more carbon than is indicated by the formula TiC. This may be done by adding more carbon than is required according to the Ridgway patent to produce TiC and heating the mix in the furnace hotter than stated by the Ridgway patent, namely by heating the material to a temperature of around 3140° C. that is to say the melting point of titanium carbide. This produces a carbon-rich titanium carbide in which the carbon is in solid solution in the TiC. I find that this material can be hot molded to produce very strong pieces in accordance with this invention whereas more or less pure titanium carbide TiC produces relatively weaker pieces. Furthermore some pieces cannot be molded at all using pure titanium carbide TiC whereas using more carbon-rich titanium carbide I can mold various complicated shapes, for example having Venturi bores which are specifically needed for various kinds of nozzles.

Proceeding in the foregoing manner, pieces of titanium carbide result having a carbon ratio of from less than one mol that is down to about .8 mol to more than one mol that is up to about 1.5 mol. I can analyze a given lot of grain to find out the proportion of carbon therein and pieces having the same proportion of carbon will have the same color. So therefore by the aid of analysis and color observation I can pick from the mass of pieces produced in the furnace according to the above process those having the desired range of carbon content. The more carbon a piece contains, the darker is its color and the closer a piece is to pure TiC the more brilliant is its surface. I select such pieces or lumps as average from 1.1 mols of carbon to 1.5 mols of carbon. It is not necessary that all of the lumps have the same formula. For example, if for a particular article I want a molar ratio of carbon of 1.35 I can have equal parts by weight of pieces having a mol ratio of 1.2 to 1.5. I crush the lumps to grit sizes 10 microns and finer and, after acid treatment to remove iron contamination and residual amounts of unreacted titania, the material is vacuum-dried at a temperature of around 80° C. The fines are thoroughly mixed in order that the molar ratio of carbon shall be the same throughout the mass. On analysis the total Ti+C should equal at least 98% and this is the material which, after molding as herein described, becomes a dense article of the character indicated.

I place a quantity of this fine carbon rich titanium carbide in a graphite mold to produce the desired shape and then place the mold in a suitable furnace provided with pressure apparatus. An inductive tube furnace may be used, but at all events I have had very satisfactory results using the resistance tube furnace described in U. S. Letters Patent No. 2,125,588 to Raymond R. Ridgway dated August 2, 1938. The molding operation may be carried out as described in this Patent No. 2,125,588 and as also described in U. S. Letters Patent to Raymond R. Ridgway and Bruce L. Bailey No. 2,027,786 dated January 14, 1936.

The preferred pressure which I recommend when using the Ridgway furnace is 2500 pounds to the square inch. At 2380° C. the titanium carbide fines coalesce to produce a solid article. A preferred procedure in detail is to start with a pressure of about 20% of the final pressure when the powder is cold, which would be about 500 pounds per square inch, then to increase the pressure to the full 2500 pounds per square inch when the powder has reached a temperature of about 100° C. below the top temperature, for example at 2280° C. and maintain the pressure at the full 2500 pounds per square inch until the material, after reaching its top temperature as above indicated, has cooled off substantially to room temperature. This procedure is adopted to avoid fracturing the graphite molds because I believe that graphite is stronger at 2380° C. than it is at 25° C. Of course after the titanium carbide has been compacted into a molded piece and has cooled somewhat, it has substantial mechanical strength and will take the thrust all alone. The pressure of 2500 pounds per square inch is selected because the graphite molds and tubes (whose strength varies) will not always stand a greater pressure and to make dense pieces the pressure should be as high as possible. However, lower pressures can be used, down to 1000 pounds per square inch and higher pressures than 2500 pounds per square inch can be used for particular pieces where the molds are so large that they can stand the higher pressures. In fact, there is no limit to the pressure on the upper side except the ability of the molds to withstand the pressure.

Characteristics of molded titanium carbide made in accordance with this invention are that it has a compressive strength at room temperature of around 400,000 pounds per square inch, it is relatively strong at elevated temperature right up to 2000° C., it has a resistivity at 20° C. of $170 \times 10^{-6}$ ohm cm., it has a modulus of rupture in bending of up to 68,000 pounds per square inch and it has a hardness of 2470 on the Knoop scale with a 100 gram load. Ordinary silicon carbide has a hardness of 2460 and green silicon carbide has a hardness of 2480, both on the Knoop scale with a 100 gram load.

The melting point of titanium carbide pieces made according to this invention is about 3140° C. This is about the same as the melting point of the lumps produced by the Ridgway process. The hot-molding point, as discovered by me, is around 2380° C. and should never be above 2500° C. if strong pieces are to be made. Likewise it should never drop below 2200° C.

It is surprising that the hot-molding point of titanium carbide is so far below the melting point. As a matter of fact, hitherto it was considered by some that titanium carbide could not successfully be hot-molded to make strong pieces because it was known that it could not be successfully hot-molded at a temperature close to its melting point. It was logical to suppose that if titanium carbide could be hot-molded at all, it would have to be hot-molded at a temperature close to its melting point because in the case of the only other carbide which, unmixed with any other carbide or any other substance, has been hot-molded to a large extent, the hot-molding point is close to the melting point. I refer to boron carbide whose melting point is close to 2350° C. and whose preferred hot-molding point is close to 2255° C.

Excellent mortars and pestles can be made by molding titanium carbide according to this invention because it is hard, will take a high polish, and does not readily heat with most substances. Excellent crucibles can be made because it is conductive, refractory and non-reactive toward most substances even at elevated temperatures. The conductivity of titanium carbide may be utilized for heating the crucibles inductively. The above qualities and also the considerable strength of molded titanium carbide make it useful for many kinds of laboratory ware and also for rocket nozzles and liners as well as jet propulsion venturis. Pieces molded from titanium carbide may also be used for the blades and other parts of gas turbines including jet propulsion turbines where refractoriness and non-reactivity are qualities especially wanted. Superior tubes for induction tube furnaces can be made of this material. The molded pieces have a density close to the theoretical density of the substance which is believed to be about 4.93. I have made pieces whose density was 4.89. Many other uses for this material will suggest themselves to those skilled in the art and will be found.

With regard to the grit size of the titanium carbide fines to be molded I find that superior results are obtained using particles 90% of which are as fine as 10 microns there being no particles over 100 microns and in general satisfactory pieces can be made if 90% of the particles are not over 200 microns with no particles larger than 500 microns.

While aforesaid I have made pieces as dense as 4.89, good molded pieces can be made having densities down to about 4.50.

It will thus be seen that there has been provided by this invention a process for the manufacture of dense refractory articles in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

I claim:

A molded article of carbon-rich titanium carbide having from 1.1 to 1.5 mols of carbon to one mol of titanium and having a density of at least 4.50.

HAROLD R. MONTGOMERY.

REFERENCES CITED

The following references are of record in the file of this patent:

UNITED STATES PATENTS

| Number | Name | Date |
|---|---|---|
| 2,125,588 | Ridgway | Aug. 2, 1938 |